Nov. 27, 1962   J. A. HERRMANN ETAL   3,066,273
MEANS FOR SECURING APPLIANCES TO ELECTRIC DISTRIBUTION DUCT
Filed Nov. 14, 1960   3 Sheets-Sheet 2
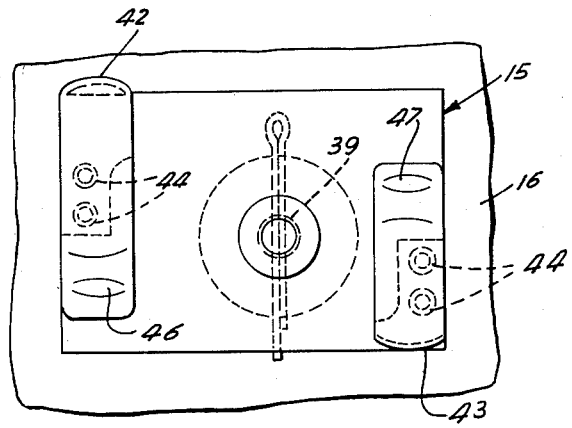
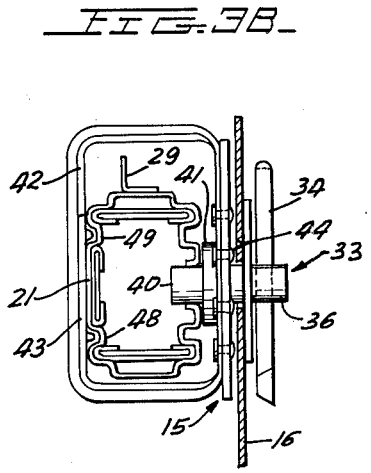
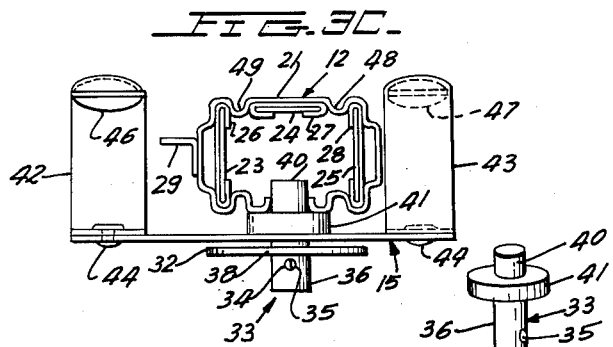
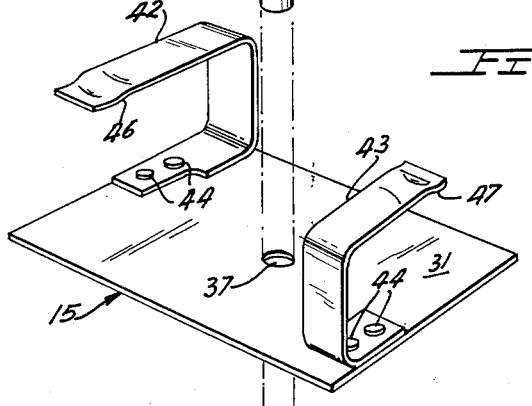
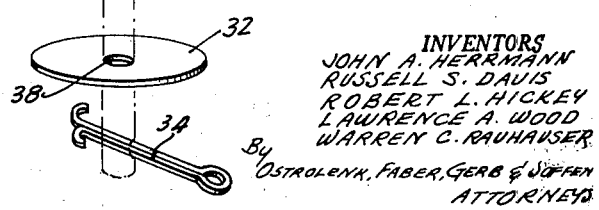
INVENTORS
JOHN A. HERRMANN
RUSSELL S. DAVIS
ROBERT L. HICKEY
LAWRENCE A. WOOD
WARREN C. RAUHAUSER
BY OSTROLENK, FABER, GERB & SOFFEN
ATTORNEYS Nov. 27, 1962 J. A. HERRMANN ETAL 3,066,273
MEANS FOR SECURING APPLIANCES TO ELECTRIC DISTRIBUTION DUCT
Filed Nov. 14, 1960 3 Sheets-Sheet 3
FIG. 4A.
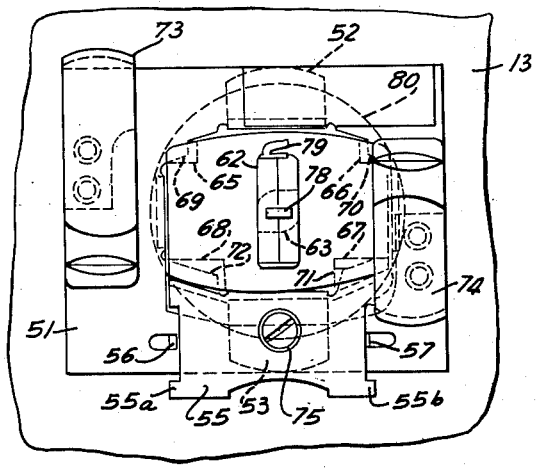
FIG. 4B.
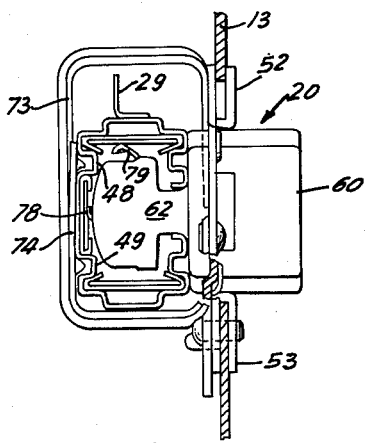
FIG. 4C.
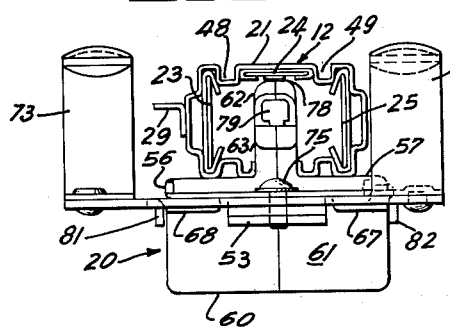
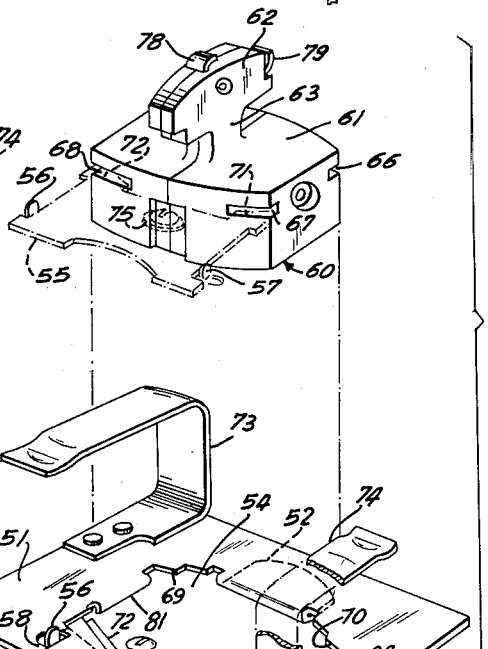
FIG. 4.
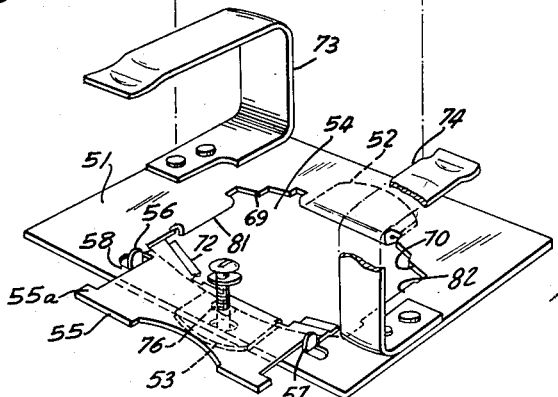
INVENTORS
JOHN A. HERRMANN
RUSSELL S. DAVIS
ROBERT L. HICKEY
LAWRENCE A. WOOD
WARREN C. RAUHAUSER
By OSTROLENK, FABER, GERB & SOFFEN
ATTORNEYS

United States Patent Office 3,066,273
Patented Nov. 27, 1962

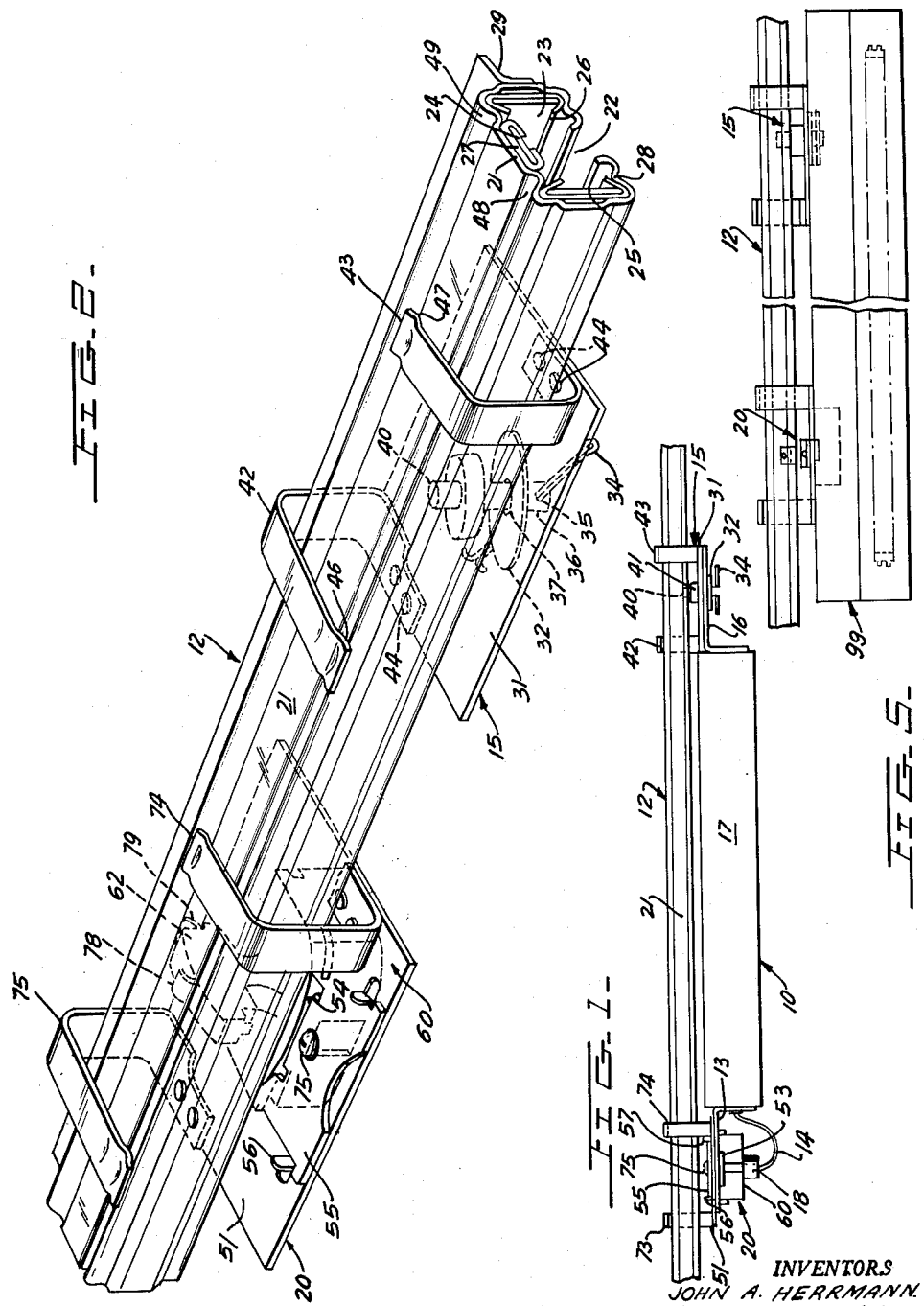

3,066,273
MEANS FOR SECURING APPLIANCES TO
ELECTRIC DISTRIBUTION DUCT
John A. Herrmann, Grosse Pointe Farms, Russell S. Davis, Detroit, Robert L. Hickey, St. Clair Shores, Lawrence A. Wood, Mount Clemens, and Warren C. Rauhauser, Detroit, Mich., assignors to I-T-E Circuit Breaker Company, Philadelphia, Pa., a corporation of Pennsylvania
Filed Nov. 14, 1960, Ser. No. 69,157
20 Claims. (Cl. 339—91)

This invention relates to a fastening means for securing appliances to an electric distribution duct in a manner such that installation and servicing times are materially reduced.

In the past appliances, such as lighting fixtures, have been secured to electric distribution duct by utilizing at least two hangers for each appliance. Each of the hangers were pre-positioned and fastened individually to the duct. The appliances were then fastened to the hangers either by hanging on to the hook of one type of hanger or by inserting the threaded ends of another type of hanger into holes in the appliance and then running a wing nut up tight on the stud. A receptacle for tapping power from the duct was then attached thereto and the light cord of the appliance was attached to the receptacle to electrically energize the appliance.

With the development of the roll-in method for installing electric distribution duct it became highly desirable to have a means of fastening appliances to the duct in a manner such that the time required for fastening was kept to a minimum. The roll-in method is fully described in the J. A. Herrmann, et al. copending application Serial No. 666,143, filed June 17, 1957, entitled "Roller Hangers for Busway" now issued as U.S. Patent 2,969,438 on January 24, 1961 and assigned to the assignee of the instant invention.

The quick fastening means of the instant invention comprises two devices for each appliance. One of the devices is strictly a mechanical hanger and the other device is a combined mechanical hanger and electrical feed-in device such as a receptacle. These devices fulfill the need for rapid and convenient appliance installation and removal means since both devices can readily be assembled to the appliance either by the appliance manufacturer or by the electrical contactor in the field.

After the hanger devices are secured to the appliance the appliance can readily be fastened to the duct by simply rotating the hanger device 90° so that hanger clips on each device snap over the housing of the duct in a manner described in connection with the tap off unit described in detail in copending application Serial No. 584,342, filed May 11, 1956, to J. A. Herrmann et al. entitled "Polarized Duct System," now issued as U.S. Patent 2,968,782 on January 17, 1961 and assigned to the assignee of the instant invention. Disconnecting and removing the appliance from the duct is simply the reverse of the installation procedure.

Each of the hanger devices is provided with a bearing and a plate which are mounted together by means defining a rotational axis for the device. The means defining the rotational axis is disposed within an opening of the appliance housing. The bearing and the plate of the device are spaced apart and the portion of the appliance housing immediately surrounding the opening is sandwiched between the bearing and the plate.

For the device comprising the strictly mechanical hanger the axis defining means comprises a pin having an extension which cooperates with a formation of the duct housing to initially position the device with respect to the duct housing. The axis defining means for the device which includes the receptacle is comprised of a portion of the receptacle insulating body. This portion also cooperates with a duct housing formation for initially positioning the device with respect to the duct.

Accordingly, a primary object of the instant invention is to provide a novel quick fastening means for securing an appliance to an electric distribution duct.

Another object is to provide a novel mechanical hanger which is rotatable with respect to the appliance and includes means for initially positioning the device with respect to the duct housing.

Still another object is to provide a hanger device which includes an appliance energizing means and is also mounted to the appliance for rotation relative thereto.

A further object is to provide a hanger means for securing an appliance to an electric distribution duct which is constructed in a manner such that the hanger means is mounted to the appliance prior to mounting of the appliance to the duct.

These as well as other objects of the instant invention shall become readily apparent after reading the following description of the accompanying drawings in which:

FIGURE 1 is a side elevation illustrating a lighting fixture mounted to a busway by means of hanger devices constructed in accordance with the teachings of the instant invention.

FIGURE 2 is a perspective illustrating a fragmentary section of a busway and the two hanger devices of FIGURE 1 mounted thereon.

FIGURE 3 is an exploded perspective of the hanger device having purely mechanical features.

FIGURES 3A-3C are a plan view, an end view, and a side elevation, respectively, of the hanger device illustrated in FIGURE 3. In FIGURE 3B the hanger device is in final mounting position on the busway while in FIGURE 3C the hanger device is in its initial mounting position on the busway.

FIGURE 4 is an exploded perspective of the hanger device which includes means for making electrical connections to the busway.

FIGURES 4A-4C are a plan view, an end view, and a side elevation, respectively, of the hanger device illustrated in FIGURE 4. In FIGURE 4B the hanger device is in final mounting position on the busway while in FIGURE 4C the hanger device is in its initial mounting position of the busway.

FIGURE 5 is a side elevation of a lighting fixture mounted to a busway by means of the hanger devices of FIGURES 3 and 4 with the devices being mounted within apertures in the fixture housing proper.

Now referring to the figures, in FIGURE 1 an appliance in the form of lighting fixture 10 is shown mounted to busway 12 by means of hanger devices 15 and 20 whose constructions shall be hereinafter described in detail. Hanger device 15 is a purely mechanical means mounted to a horizontal leg of bracket 16 which is secured in a suitable manner to the right end of fixture housing 17. Hanger device 20 is mounted to the horizontal leg of bracket 13 secured to the left end of fixture housing 17. Extension cord 14, having plug cap 18 at one end thereof, extends from the left end of housing 17 with the prongs of plug cap 18 being connected to hanger device 20 for electrical energization of lighting fixture 10.

Briefly, busway 12 comprises an elongated housing 21 having a longitudinally extending opening 22 in the bottom thereof. Housing 21 is suitably formed to operatively position and maintain three bus bars 23–25 which are insulated therefrom by insulation sheets 26–28, respectively, having distorted C-shaped cross-sections. Busway 12 also includes a longitudinal polarizing rib 29 which extends outwardly from one side of housing 21.

The strictly mechanical hanger 15 illustrated in FIGURES 3–3C comprises plate 31 and bearing means in the form of washer 32, both mounted to pin 33 by cotter pin 34 which extends through transverse aperture 35 of pin 33. The lower end 36 of pin 33 extends through apertures 37 and 38 in plate 31 and washer 32, respectively, as well as through aperture 39 in the horizontal leg of bracket 16.

The upper portion 40 of pin 33 extends into opening 22 of busway housing 21 for initial positioning of device 15 with respect to busway 12. Pin 33 further includes an integrally formed collar 41 which limits the movement of pin 33 into busway housing 21 and also properly positions plate 31 so that hanger clips 42, 43 will properly engage busway housing 21. The horizontal leg of the fixture bracket 13 is nested between washer 32 and plate 31 so that there can be relative rotation between hanger device 15 and appliance 17 about a center defined by pin 33.

U-shaped hanger clips 42, 43 are mounted to plate 31 as by rivets 44 and extend from plate 31 on the side opposite washer 32. It is to be noted that hanger clip 42 is more remote from pin 33 than is hanger clip 43. This is necessary because of polarizing rib 29, as fully explained in the aforesaid U.S. Patent 2,968,782. With hanger device 15 in the fully mounted position of FIGURE 3B, the offsets 46, 47 at the free ends of hanger clips 42, 43, respectively, are positioned within the longitudinally extending depressions 48, 49 of busway housing 21.

For mounting of hanger device 15 to busway 12 the upper end 40 of pin 33 is entered into housing opening 22 to assume the position illustrated in FIGURE 3C. From this position hanger device 15 is rotated about pin 33 as an axis with clip 42 being rotated out of the plane of the drawing and clip 43 being rotated into the plane of the drawing with respect to FIGURE 3C until such time as offset 46 nests within depressions 48 and offset 47 nests within depression 49.

Now referring more particularly to FIGURES 4–4C, hanger device 20 includes plate 51 and a bearing means comprised of tabs 52, 53. Tab 52 is integrally formed with plate 51 and extends outwardly from plate aperture 54 parallel to plate 51. Tab 53 which is part of sliding fastener 55 is formed integrally therewith and extends parallel thereto.

Fastener 55 is mounted to plate 51 so that a portion of plate 51 is disposed in the space between tab 53 and a main portion of fastener 55. With fastener 55 in final position, there is a space between tab 53 and plate 51 which is equal in thickness to that of the space between tab 52 and plate 51 with the horizontal leg of appliance bracket 13 being disposed within these spaces.

Upwardly turned ears 56, 57 lanced from plate 51 are positioned within fastener open slots 58, 59, respectively. Ears 56, 57 extend upwardly from plate 51 for a distance which exceeds the spacing between tab 53 and fastener 55 less the thickness of plate 51. Initially fastener 55 must be forced over ears 56, 57. Thus, when fastener 55 is mounted to plate 51 it is slidable with respect thereto yet is not readily removable therefrom.

Hanger device 20 further includes a plug cap receptacle 60 which is illustrated in detail in the aforesaid U.S. Patent No. 2,968,782. Briefly, receptacle 60 comprises insulating body 61 having a narrowed upward extension 62 which is further narrowed at 63 to provide means for defining an axis of rotation for hanger device 20 with respect to busway 12. Body 61 includes horizontal notches 65–68. The portion of plate 51 defining aperture 54 includes projections 69, 70 which extend into notches 65, 66, respectively. Fastener 55 includes projections 71, 72 which are offset so as to be positioned in the plane of plate 51 and are entered into notches 67, 68, respectively. As described in the aforesaid application body notches 65–68 are not all of the same size so that polarizing is achieved. Hanger device 20 also includes hanger clips 73, 74 riveted to plate 51 and positioned relative to the rotational axis defined by insulating body portion 63 in the same manner as the clips 42, 43 of FIGURE 3.

For mounting receptacle 60 to plate 51 and mounting device 20 to bracket 16 fastener 55 is moved to a position where portions 55a, 55b thereof abut ears 56, 57, respectively. Tab 52 is entered through aperture 80 in bracket 16 and plate 51 is moved so that a portion of bracket 13 lies in the space between tab 52 and plate 51. Tab 53 enters through aperture 80 and fastener 55 is moved to the position of FIGURE 4 with another portion of bracket 16 lying in the space between tab 53 and plate 51. Fastener 55 can be moved to the position of FIGURE 4 only by withdrawing screw 75 so that the lower end thereof is cleared of plate 51.

Receptacle 50 is then inserted into plate aperture 54 with projections 69, 70 being entered into receptacle notches 55, 56, respectively. Fastener projections 71, 72 are then moved into receptacle notches 67, 68, respectively. Fastener 55 is maintained in this position by rotating screw 75 so that the free end thereof extends through plate notch 76 and aperture 77 of tab 53. In this position of screw 75 plate 51 blocks movement of fastener 55 in its position of FIGURE 4.

Hanger device 20 is mounted to busway 12 by rotating device 20 with respect to bracket 16 so that insulator body 61 as well as clips 73, 74 are positioned to permit insertion of body portion 62 through housing opening 22. Portion 62 is then inserted into housing 21 to the initial position illustrated in FIGURE 4C.

Thereafter, device 20 is rotated relative to mounting bracket 16 to assume the final mounting position of FIGURE 4B. In this position receptacle contacts 78, 79 are in engagement with bus bars 24, 25, respectively. Contacts 78, 79, as is well known to the art, each include portions which extend to the lower part of body 51 with these portions being accessible through prong receiving apertures (not shown) in the bottom of insulating body 61.

It is to be noted that plate aperture 54 is partially bounded by upwardly turned ears 81, 82 which are engaged by bracket 16 thereby preventing same from contacting insulating body 50, 51 and possibly causing damage thereto.

An important safety feature embodies in hanger device 20 is that once an appliance is fastened to a busway by device 20 the appliance cannot work itself free even if screw 75 were to become loosened and fully backed out. With screw 75 backed out, sliding fastener 55 can only back off from receptacle 60, but this action only serves to more fully engage tab 53 of the sliding fastener 55 with the appliance bracket. It is impossible for fastener 55 to move inward because receptacle 60, which prevents such inward movement, is held in position by being engaged with the busway and plate 51 is fixed to the busway by clips 73, 74. Thus, the only way the appliance can be removed from the busway is to rotate hanger device 20 for 90° and this cannot be caused by vibration since the offset ends of clips 73, 74 are disposed within duct housing recesses, 48, 49, respectively, by spring pressure created in the hanger clips 73, 74 by snapping them over duct housing 21.

While hanger devices 15 and 20 are illustrated in FIGURE 2 as being mounted to brackets 16 and 13 at the ends of fixture housing 17, it is apparent to one skilled in the art that appropriate openings can be placed in the top of a suitably proportioned fixture housing and the devices 15 and 20 inserted into these last mentioned openings thereby eliminating end brackets and a substantial portion of the length of cord 14. Such an arrangement is illustrated in FIGURE 5 wherein hanger devices 15 and 20 secure fluorescent lighting fixture 99 to busway 12.

Thus, this invention provides a novel means for securing an appliance to a busway structure with this novel means being such that installation and servicing time are substantially reduced. Securement to the busway is accomplished readily without the necessity of utilizing tools or special appliances.

Although we have here described preferred embodiment of our novel invention, many variations and modifications will now be apparent to those skilled in the art, and we therefore prefer to be limited, not by the specific disclosure herein, but only by the appending claims.

We claim:

1. A device for fastening an appliance to a duct, said device including a plate, a first and a second hook-like hanger clip extending from one side of said plate and adapted to engage a duct, a bearing means on the other side of said plate, a means to which said bearing means and said plate are mounted, said bearing means being spaced from said plate whereby a plate-like portion of an appliance may be received therebetween for mounting of said device to an appliance for rotatable movement with respect thereto.

2. A device for fastening an appliance to a duct, said device including a plate, a first and a second hook-like hanger clip extending from one side of said plate and adapted to engage a duct, a bearing means on the other side of said plate, first means on which said bearing means and said plate are mounted, said bearing means being spaced from said plate whereby a plate-like portion of an appliance may be received therebetween for mounting of said device to an appliance for rotatable movement with respect thereto; second means extending from said plate one side for initial positioning of said device relative to a duct upon which said device will be mounted.

3. A device for fastening an appliance to a duct, said device including a plate, a first and a second hook-like hanger clip extending from one side of said plate and adapted to engage a duct, a bearing means on the other side of said plate, first means on which said bearing means and said plate are mounted, said bearing means being spaced from said plate whereby a plate-like portion of an appliance may be received therebetween for mounting of said device to an appliance for rotatable movement with respect thereto; second means extending from said plate one side for initial positioning of said device relative to a duct upon which said device will be mounted; said second means providing a rotational axis for said device during mounting thereto to a duct; each of said clips having a portion; said first clip portion being spaced from said axis a greater distance than the spacing therefrom of said second clip portion whereby said clips cooperate with polarizing means of a duct to assure mounting of said device to a duct in a predetermined relationship.

4. A device for fastening an applicance to a duct, said device including a plate, a first and a second hook-like hanger clip extending from one side of said plate and adapted to engage a duct, a bearing means on the other side of said plate, first means on which said bearing means and said plate are mounted, said bearing means being spaced from said plate whereby a plate-like portion of an appliance may be received therebetween for mounting of said device to an appliance for rotatable movement with respect thereto; second means extending from said plate one side for initial positioning of said device relative to a duct upon which said device will be mounted; said first means comprising a pin having a first portion extending through a clearance hole in said bearing means, said second means comprising a second portion of said pin.

5. A device for fastening an appliance to a duct, said device including a plate, a first and a second hook-like hanger clip extending from one side of said plate and adapted to engage a duct, a bearing means on the other side of said plate, first means on which said bearing means and said plate are mounted, said bearing means being spaced from said plate whereby a plate-like portion of an appliance may be received therebetween for mounting of said device to an appliance for rotatable movement with respect thereto; second means extending from said plate one side for initial positioning of said device relative to a duct upon which said device will be mounted; said first means comprising a receptacle including an insulating body having plug prong receiving apertures positioned on said plate other side, a first and a second contact mounted within said body and having portions extending externally of said body at a first portion thereof positioned on said plate one side; said second means comprising a second portion of said body; said first portion being disposed at a position more remote from said plate than said second portion.

6. A device for fastening an appliance to a duct, said device including a plate, a first and a second hook-like hanger clip extending from one side of said plate and adapted to engage a duct, a bearing means on the other side of said plate, pin means extending through aligned clearance apertures in said plate and said bearing means, a collar on said pin positioned on said plate one side and too large to pass through said plate aperture, a removable retainer mounted to said pin means at a point more remote from said plate than said bearing means, said bearing means being spaced from said plate whereby a plate-like portion of an appliance may be received therebetween for mounting of said device to an appliance for rotatable movement with respect thereto about an axis defined by said pin means.

7. A device for fastening an appliance to a duct, said device including a plate, a first and a second hook-like hanger clip extending from one side of said plate and adapted to engage a duct, a bearing means on the other side of said plate, pin means extending through aligned clearance apertures in said plate and bearing means, a collar on said pin positioned on said plate one side and too large to pass through said plate aperture, a removable retainer mounted on said pin means at a point more remote from said plate than said bearing means, said bearing means being spaced from said plate whereby a plate-like portion of an appliance may be received therebetween for mounting of said device to an appliance for rotatable movement with respect thereto about an axis defined by said pin means; said pin means having a portion on said plate one side disposed more demote from said plate than said collar for initial positioning of said device relative to a duct upon which said device will be mounted.

8. A device for fastening an appliance to a duct, said device including a plate, a first and a second hook-like hanger clip extending from one side of said plate and adapted to engage a duct, a bearing means on the other side of said plate, pin means extending through aligned clearance apertures in said plate and bearing means, a collar on said pin positioned on said plate one side and too large to pass through said plate aperture, a removable retainer mounted to said pin means at a point more remote from said plate than said bearing means, said bearing means being spaced from said plate whereby a plate-like portion of an appliance may be received therebetween for mounting of said device to an appliance for rotatable movement with respect thereto about an axis defined by said pin means; said pin means having a portion on said plate one side disposed more remote from said plate than said collar for initial positioning of said device relative to a duct upon which said device will be mounted; said pin means providing a rotational axis for said device during mounting thereof to a duct; each of said clips having a portion; said first clip portion being spaced from said axis a greater distance than the spacing therefrom of said second clip portion whereby said clips cooperate with polarizing means of a duct to assure mounting of said device to a duct in a predetermined relationship.

9. A device for fastening an appliance to a duct, said device including a plate, a first and a second hook-like hanger clip extending from one side of said plate and adapted to engage a duct, a bearing means on the other side of said plate, a plug cap receptacle including an insulating body positioned within a hole of said plate, a sliding fastener mounted to said plate, said fastener and said plate having formations cooperating with formations of said body to mount said receptacle to said plate, said bearing means comprising a first portion fixedly mounted to said plate and a second portion which is part of said fastener, said bearing means being spaced from said plate whereby a plate-like portion of an appliance may be received therebetween for mounting of said device to an appliance for rotatable movement with respect thereto.

10. A device for fastening an appliance to a duct, said device including a plate, a first and a second hook-like hanger clip extending from one side of said plate and adapted to engage a duct, a bearing means on the other side of said plate, a plug cap receptacle including an insulating body positioned within a hole of said plate, a sliding fastener mounted on said plate, said fastener and said plate having formations cooperating with formations of said body to mount said receptacle on said plate, said bearing means comprising a first portion fixedly mounted to said plate and a second portion which is part of said fastener, said bearing means being spaced from said plate whereby a plate-like portion of an appliance may be received therebetween for mounting of said device to an appliance for rotatable movement with respect thereto; means extending from said plate other side for positioning and guiding movement of said device relative to an appliance to which it is mounted.

11. A device for fastening an appliance to a duct, said device including a plate, a first and a second hook-like hanger clip extending from one side of said plate and adapted to engage a duct, a bearing means on the other side of said plate, a plug cap receptacle including an insulating body positioned within a hole of said plate, a sliding fastener mounted to said plate, said fastener and said plate having formations cooperating with formations of said body to mount said receptacle to said plate, said bearing means comprising a first portion fixedly mounted to said plate and a second portion which is part of said fastener, said bearing means being spaced from said plate whereby a plate-like portion of an appliance may be received therebetween for mounting of said device to an appliance for rotatable movement with respect thereto; means extending from said plate one side cooperating with formations of said fastener for retention thereof to said plate.

12. A device for fastening an appliance to a duct, said device including a plate, a first and a second hook-like hanger clip extending from one side of said plate and adapted to engage a duct, a bearing means on the other side of said plate, a plug cap receptacle including an insulating body positioned within a hole of said plate, a sliding fastener mounted to said plate, said fastener and said plate having formations cooperating with formations of said body to mount said receptacle to said plate, said bearing means comprising a first portion fixedly mounted to said plate and a second portion which is part of said fastener, said bearing means being spaced from said plate whereby a plate-like portion of an appliance may be received therebetween for mounting of said device to an appliance for rotatable movement with respect thereto; means extending from said plate other side for positioning and guiding movement of said device relative to an appliance to which it is mounted; means extending from said plate one side cooperating with formations of said fastener for retention thereof to said plate.

13. A device for fastening an appliance to a duct, said device including a plate, a first and a second hook-like hanger clip extending from one side of said plate and adapted to engage a duct, a bearing means on the other side of said plate, a plug cap receptacle including an insulating body positioned within a hole of said plate, a sliding fastener mounted to said plate, said fastener and said plate having formations cooperating with formations of said body to mount said receptacle to said plate, said bearing means comprising a first portion fixedly mounted to said plate and a second portion which is part of said fastener, said bearing means being spaced from said plate whereby a plate-like portion of an appliance may be received therebetween for mounting of said device to an appliance for rotatable movement with respect thereto; means for retaining said fastener in a position for securing said receptacle to said plate.

14. A device for fastening an appliance to a duct, said device including a plate, a first and a second hook-like hanger clip extending from one side of said plate and adapted to engage a duct, a bearing means on the other side of said plate, a plug cap receptacle including an insulating body positioned within a hole of said plate, a sliding fastener mounted to said plate, said fastener and said plate having formations cooperating with formations of said body to mount said receptacle to said plate, said bearing means comprising a first portion fixedly mounted to said plate and a second portion which is part of said fastener, said bearing means being spaced from said plate whereby a plate-like portion of an appliance may be received therebetween for mounting of said device to an appliance for rotatable movement with respect thereto; a member carried by said fastener and positionable to cooperate with a portion of said plate for retaining said fastener in a position for securing said receptacle to said plate.

15. A device for fastening an appliance to a duct, said device including a plate, a first and a second hook-like hanger clip extending from one side of said plate and adapted to engage a duct, a bearing means on the other side of said plate, a plug cap receptacle including an insulating body positioned within a hole of said plate, a sliding fastener mounted to said plate, said fastener and said plate having formations cooperating with formations of said body to mount said receptacle to said plate, said bearing means comprising a first portion fixedly mounted to said plate and a second portion which is part of said fastener, said bearing means being spaced from said plate whereby a plate-like portion of an appliance may be received therebetween for mounting of said device to an appliance for rotatable movement with respect thereto; said body having plug prong receiving apertures positioned on said plate one side; said receptacle further including a first and a second contact mounted within said body and having portions extending externally of said body at a first portion thereof positioned on said plate first side; a second portion of said body also positioned on said plate one side for initial positioning of said device relative to a duct upon which said device will be mounted; said first body portion being disposed at a position more remote from said plate than said second body portion.

16. A device for fastening an appliance to a duct, said device including a plate, a first and a second hook-like hanger clip extending from one side of said plate and adapted to engage a duct, a bearing means on the one side of said plate, a plug cap receptacle including an insulating body positioned within a hole of said plate, a sliding fastener mounted to said plate, said fastener and said plate having formations cooperating with formations of said body to mount said receptacle to said plate, said bearing means comprising a first portion fixedly mounted to said plate and a second portion which is part of said fastener, said bearing means being spaced from said plate whereby a plate-like portion of an appliance may be received therebetween for mounting of said device to an appliance for rotatable movement with respect thereto; said body having plug prong receiving apertures positioned on said plate one side; said receptacle further including a first and a second contact mounted within said body and having portions extending externally of said body at a first portion thereof positioned on said plate first side; a second portion of said body also positioned on said plate one side for initial positioning of said device relative to a duct upon which said device will be mounted; said first body portion being disposed at a position more remote from said plate than said second body portion; said second body portion providing a rotational axis for said device during mounting thereof to a duct; each of said clips having a portion; said first clip portion being spaced from said axis a greater distance than the spacing therefrom of said second clip portion whereby said clips cooperate with polarizing means of a duct to assure mounting of said device to a duct in a predetermined relationship.

17. The combination of an electrical appliance and a first and a second device for mechanically securing said appliance to an electric distribution duct; said appliance including a first and a second plate-like portion; each of said first and said second devices comprising a plate, a first and a second hook-like hanger clip extending from one side of said plate and adapted to engage a duct housing, a bearing means on the other side of said plate, means to which said bearing means and said plate are mounted with said bearing means spaced from said plate to form an area therebetween; said first plate-like portion entered into the area of the first device and the second plate-like portion entered into the area of the second device whereby said first and said second devices are mounted to said appliance for rotation with respect to said appliance about axes defined by said means of said first and said second devices, respectively.

18. The combination of claim 17 in which the means of said first device comprises an insulating body forming part of an electrical receptacle; a line cord extending from said appliance to said receptacle constituting an electrical connection thereto.

19. The combination of claim 18 in which the means of said second device comprises a pin extending through a clearance hole in said bearing means of said second device.

20. The combination of claim 19 in which the body and the pin each have portions extending from the first sides of the first and the second plates, respectively, for initially positioning said first and said second devices, respectively, to a duct upon which said appliance will be mounted.

References Cited in the file of this patent

UNITED STATES PATENTS

| 2,134,753 | Fisher et al. | Nov. 1, 1938 |
| 2,310,024 | Frank et al. | Feb. 2, 1943 |
| 2,929,044 | Herrmann et al. | Mar. 15, 1960 |

FOREIGN PATENTS

| 700,987 | Great Britain | Dec. 16, 1953 |